(12) United States Patent
Shin et al.

(10) Patent No.: US 7,889,326 B2
(45) Date of Patent: Feb. 15, 2011

(54) DISTANCE MEASURING APPARATUS

(75) Inventors: Dong Ik Shin, Gyunggi-do (KR); Hong Ki Kim, Gyunggi-do (KR); Back Kue Lee, Gyunggi-do (KR); Young Su Yun, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 17 days.

(21) Appl. No.: 12/504,197

(22) Filed: Jul. 16, 2009

(65) Prior Publication Data
US 2010/0097598 A1 Apr. 22, 2010

(30) Foreign Application Priority Data
Oct. 21, 2008 (KR) .................. 10-2008-0103243

(51) Int. Cl.
*G01C 3/08* (2006.01)
(52) U.S. Cl. ..................... 356/5.01; 356/4.01
(58) Field of Classification Search ............. 356/4.01, 356/5.01, 5.15; 359/642, 652, 708, 717
See application file for complete search history.

(56) References Cited

U.S. PATENT DOCUMENTS

| | | | |
|---|---|---|---|
| 4,386,848 A * | 6/1983 | Clendenin et al. | ....... 356/5.01 |
| 4,573,773 A * | 3/1986 | Arndt et al. | ........... 359/403 |
| 5,098,185 A * | 3/1992 | Watanabe et al. | ......... 356/4.01 |
| 6,894,767 B2 * | 5/2005 | Ishinabe et al. | ........... 356/5.01 |
| 7,268,857 B2 * | 9/2007 | Hua-Tang et al. | ......... 356/4.01 |
| 7,505,119 B2 * | 3/2009 | Rogers | ..................... 356/4.01 |
| 7,768,629 B2 * | 8/2010 | Typpo et al. | ............... 356/4.01 |

FOREIGN PATENT DOCUMENTS

| JP | 7-21408 | 3/1995 |
|---|---|---|
| JP | 10-20035 | 1/1998 |
| JP | 10-246627 | 9/1998 |

OTHER PUBLICATIONS

Korean Office Action issued Sep. 29, 2010 in corresponding Korean Patent Application 10-2008-0103243.

* cited by examiner

*Primary Examiner*—Isam Alsomiri

(57) ABSTRACT

A distance measuring apparatus includes a light source unit generating reference light for distance measuring, a light receiving device receiving light reflected from an object to be measured, which has received the reference light, a mirror controlling a path of the reference light, and controlling a path of light, reflected from the object to be measured, toward the light receiving device, and a sensor lens focusing the light reflected from the mirror on the light receiving device. The sensor lens includes a lens portion refracting light, a flange portion provided around the circumference of the lens portion and including a coupling portion for fixing the sensor lens, and a light passing portion formed at the lens portion.

7 Claims, 4 Drawing Sheets

DISTANCE MEASURING APPARATUS

CROSS-REFERENCE TO RELATED APPLICATIONS

This application claims the priority of Korean Patent Application No. 2008-0103243 filed on Oct. 21, 2008, in the Korean Intellectual Property Office, the disclosure of which is incorporated herein by reference.

BACKGROUND OF THE INVENTION

1. Field of the Invention

The present invention relates to a distance measuring apparatus, and more particularly, to a distance measuring apparatus which can measure the distance to an object using the time interval between the time when a light source emits light to an object and the time when light reflected by the object is received.

2. Description of the Related Art

In general, a distance measuring apparatus using light, such as a laser beam, calculates the distance from the distance measuring apparatus to an object whose distance is to be measured (hereinafter, referred to as 'object to be measured') by using the difference between the time when a light source emits reference light for distance measurement and the time when an optical sensor detects reflected light, which is the reference light reflected by the object to be measured. A pulse laser or a separate counter may be used to determine the time difference.

The related art distance measuring apparatus using light is installed such that the direction of reference light emitted from the light source has an angular difference of about 90° from the direction of reflected light which is made incident onto the optical sensor, serving to detect the reflected light, after being reflected by the object to be measured.

For example, the related art distance measuring apparatus includes a light source, a first mirror, a second mirror and an optical sensor. Here, the first mirror changes the path of reference light emitted from the light source by an angle of 90°. The second mirror changes the path of the reference light, sent from the first mirror, toward an object to be measured, and changes the path of reflected light, the reference light reflected by the object to be measured, to the direction in which the reference light is made incident. The optical sensor receives the reflected light, the path of which has been changed by the second mirror. The first mirror may be installed between the optical sensor and the second mirror.

SUMMARY OF THE INVENTION

An aspect of the present invention provides a distance measuring apparatus including a structure for mounting a sensor lens, which is an important element in the distance measuring apparatus, and also including a structure for mounting the sensor lens in a proper direction in the case where the sensor lens has an asymmetrical shape.

According to an aspect of the present invention, there is provided a distance measuring apparatus including: a light source unit generating reference light for distance measuring; a light receiving device receiving light reflected from an object to be measured, which has received the reference light; a mirror controlling a path of the reference light, and controlling a path of light, reflected from the object to be measured, toward the light receiving device; and a sensor lens focusing the light reflected from the mirror on the light receiving device, the sensor lens including: a lens portion refracting light; a flange portion provided around the circumference of the lens portion and including a coupling portion for fixing the sensor lens; and a light passing portion formed at the lens portion.

The sensor lens may further include a step portion disposed between the lens portion and the flange portion.

The lens portion may include: a first lens portion provided at one side of the flange portion and having an asymmetrical shape; and a second lens portion provided at the other side of the flange portion and having an asymmetrical shape.

The sensor lens may further include a guide unit guiding the direction that the lens portion is mounted.

The guide unit may include a guide portion provided at one side of the flange portion and having a different curvature from that of the flange portion.

The light passing portion may include a light passing hole penetrating the sensor lens.

The light passing portion may include a light passing plane formed by processing a portion of a refraction surface of the lens portion from which light is output, to be substantially perpendicular to the direction in which the light travels.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

The overall construction of the distance measuring apparatus according to an exemplary embodiment of the present invention will be briefly described with reference to FIG. 1.

Figure 1:
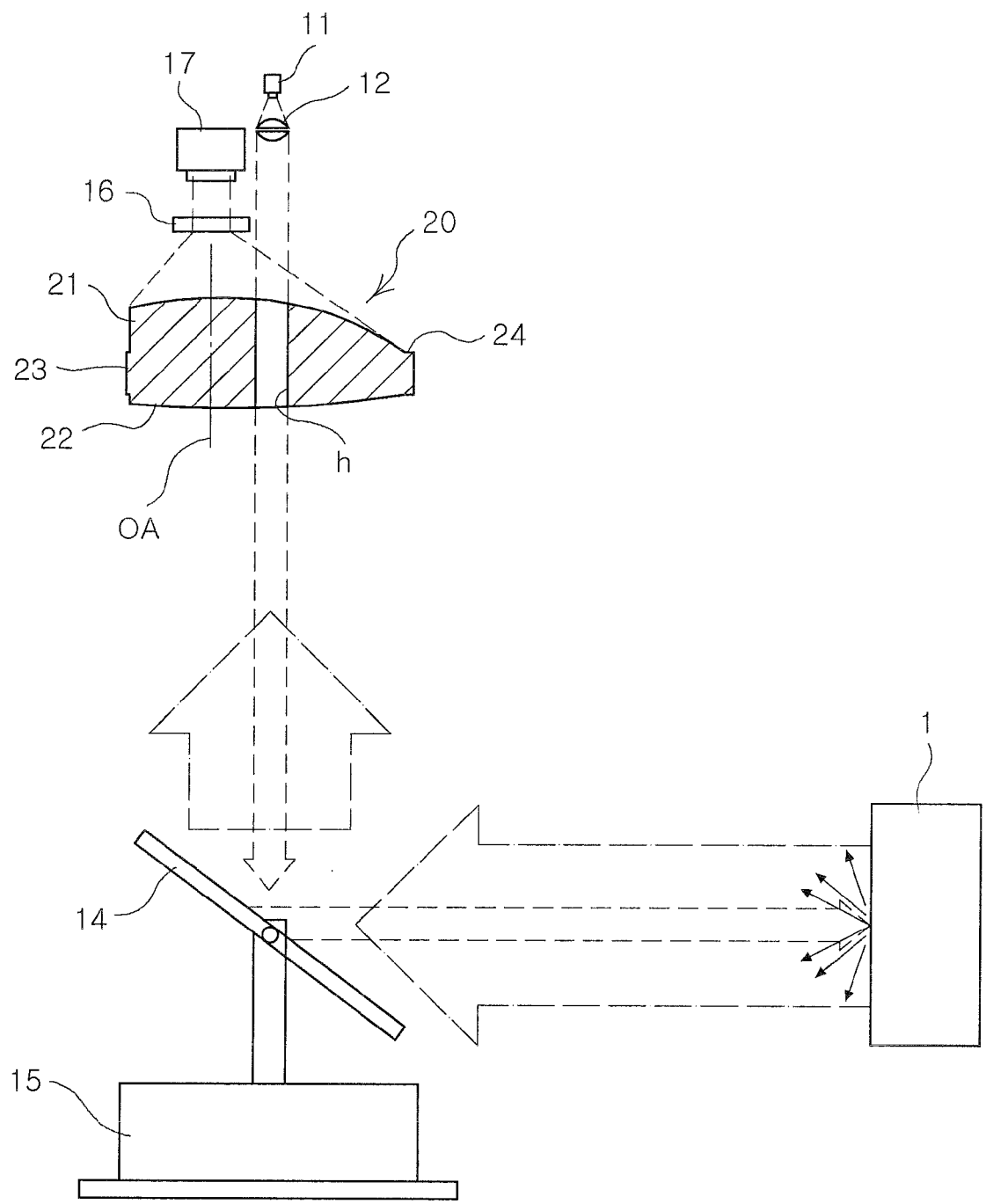
FIG. 1 is a schematic view of a distance measuring apparatus according to an exemplary embodiment of the present invention.

As shown in FIG. 1, the distance measuring apparatus according to this embodiment includes a light source unit including a light source 11 and a collimation lens 12, an optical device 17, a mirror 14 and a sensor lens 20. The distance measuring apparatus of FIG. 1 may further include an optical filter 16.

The light source 11 generates reference light for distance measurement. A pulse laser may be used as the reference light.

The collimation lens 12 converts the reference light emitted from light source 11 into parallel light beams. That is, the reference light, having passed through the collimation lens 12, becomes light parallel to one linear axis.

The optical device 17 serves to detect light falling onto the optical device 17. The optical device 17 is disposed adjacent to the light source 11.

Particularly, the optical device 17 is disposed so as to detect light traveling in the opposite direction to that of the reference light emitted from the light source 11. That is, the optical device 17 and the light source 11 are disposed such that the propagation axis of the reference light becomes substantially parallel to the propagation axis of the light detected by the optical device 17.

The mirror 14 changes the path of the reference light, which has passed through the collimation lens 12, toward an object 1 whose distance is to be measured (hereinafter, referred to as object 1 to be measured).

The mirror 14 changes the path of light, reflected by the object 1 to be measured, toward the optical device 17. That is, the mirror 14 changes the path of reference light, emitted from the light source 11, toward the object 1 to be measured, and also changes the path of light, reflected by object 1 to be measured, toward the optical device 17.

The mirror 14 may be supported by a mirror support 15 which is rotatable. The mirror support 15 supports the mirror, allowing it to rotate by use of a rotary shaft of the mirror.

Thus, it becomes possible for the distance measuring apparatus to measure the distance to every object placed horizontally around the distance measuring apparatus.

The sensor lens 20 is disposed between the light source unit 11 and 12 and the mirror 14 and between the optical device 17 and the mirror 14. The sensor lens 20 focuses reflected light reflected by the mirror 14 on the optical device 17, so that the optical device 17 can detect the reflected light.

The sensor lens 20 includes lens portions 21 and 22 that can refract light in order to focus the light reflected from the mirror 14 on the optical device 17.

The reference light, emitted from the light source 11, needs to pass through the sensor lens 20 in order to reach the mirror 14. The path of the reference light emitted from the light source 11 may not be changed until it reaches the mirror 14.

The sensor lens 20 includes a light passing portion. The light passing portion serves to prevent the reference light from being changed in its path while passing through the sensor lens 20.

As one example of the light passing portion, a light passing hole h penetrating the sensor lens 20 is illustrated in FIG. 1.

The light passing hole h allows the reference light, precisely parallel beams having passed through the collimation lens 12, to pass through the sensor lens 20 without being refracted.

Figure 2:
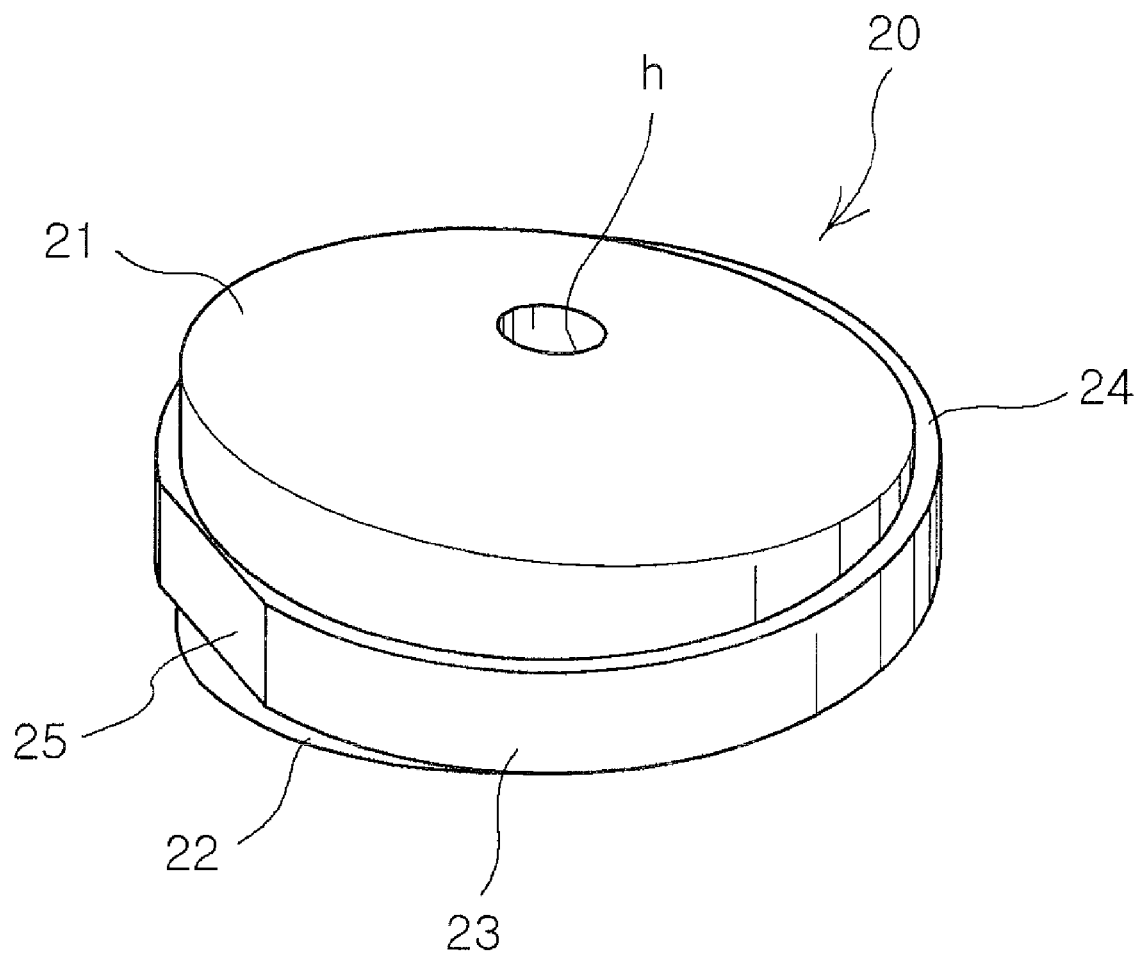
FIG. 2 is a perspective view of a sensor lens in the distance measuring apparatus of FIG. 1.

The sensor lens of the distance measuring apparatus according to this embodiment will be described in more detail with reference to FIGS. 2 and 3. FIG. 2 is a perspective view of the sensor lens of the distance measuring apparatus of FIG. 1, and FIG. 3 illustrates a plan view and a side view of the sensor lens of FIG. 2.

Figure 3:
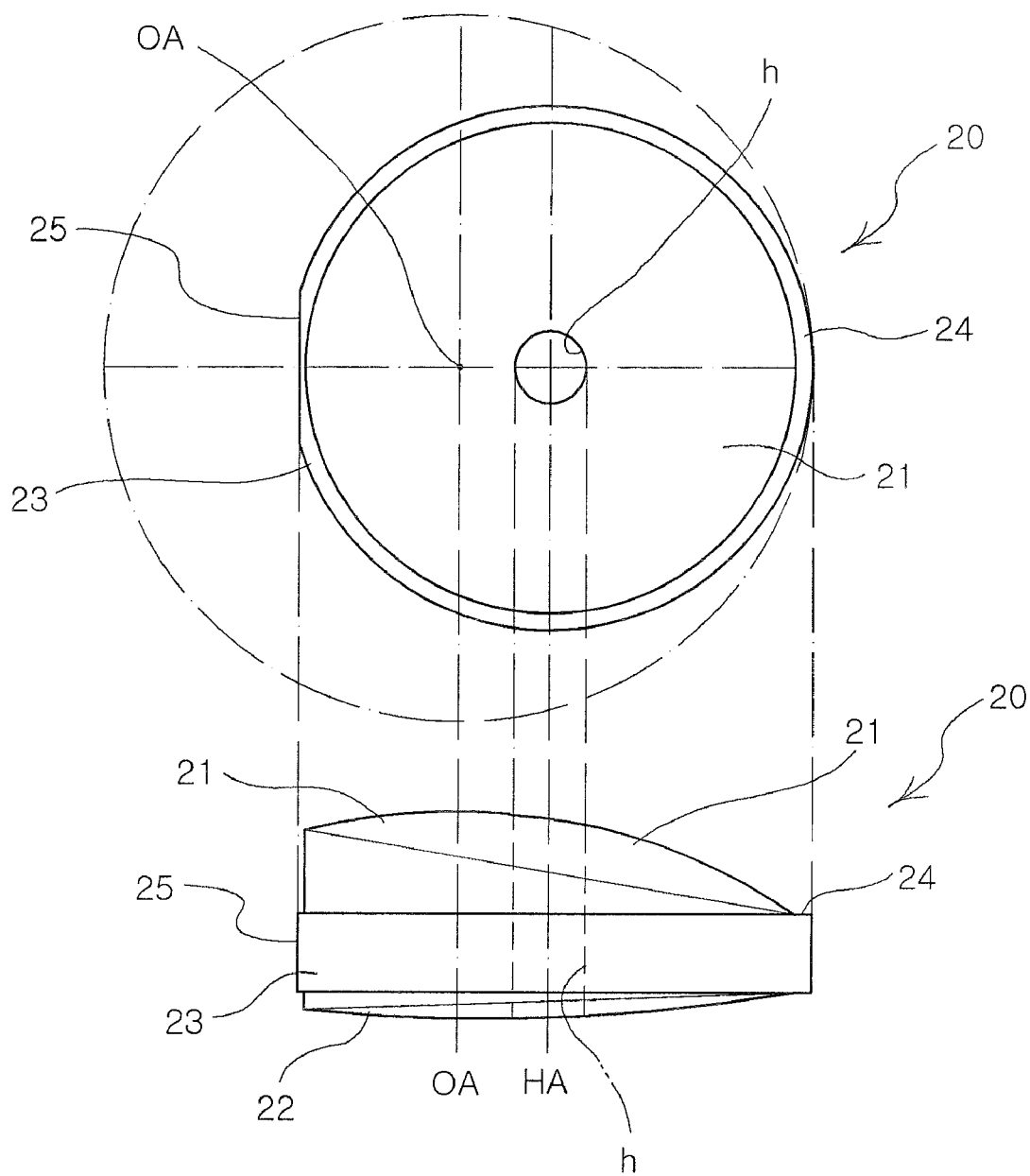
FIG. 3 illustrates a plan view and a side view of the sensor lens of FIG. 1.

As shown in FIGS. 2 and 3, the sensor lens 20, according to this embodiment, includes the lens portions 21 and 22 refracting light, a flange portion 23 disposed around the circumference of the lens portions 21 and 22 and providing a coupling part for fixing the sensor les 20, and the light passing portion formed in the lens portions 21 and 22. In this embodiment, the light passing portion is configured as the light passing hole h.

The lens portions 21 and 22 may be a first lens portion 21 provided at one side of the flange portion 23, and a second lens portion 22 provided at the other side of the flange portion 23.

Each of the first and second lens portions 21 and 22 may decrease in the thickness from one side edge to the other side edge thus having an asymmetrical shape.

The first and second lens portions 21 and 22 may each be asymmetrically manufactured in due consideration of the characteristics involving the locations of the optical device 17 and the light source 11. This is because the optical device 17 of FIG. 1 needs to be optically concentric with the sensor lens 20, and the light source 11 needs to be concentric with the light passing portion.

The thicknesses and the like of the first lens portion 21 and the second lens portion 22 may be the same as or different from each other according to the design conditions of the lens.

The flange portion 23 includes a step portion 24 between the first lens portion 21 and the second lens portion 22 to provide a coupling structure for coupling and fixing the sensor lens 20 to a predetermined structure.

That is, the distance measuring apparatus may be mounted inside a case or a separate structure. Since the sensor lens 20 needs to be fixed to some point, the fixation thereof may be difficult if the lens does not have any appropriate structural characteristics.

The flange portion 23 serves to provide a base of the coupling structure for fixing the sensor lens 20.

For example, the distance measuring apparatus, when mounted inside a separate case, may be located by the step portion 24 of the flange portion 23. Thus, the sensor lens 20 can be easily fixed inside the case.

The sensor lens 20 needs to be mounted in a proper direction because of the asymmetrical first and second lens portions 21 and 22. Therefore, the sensor lens 20 may be provided with a guide unit for guiding the direction in which the asymmetrical first and second lens portions 21 and 22 are mounted.

As for the guide unit, FIGS. 2 and 3 illustrate a guide portion 25 provided at one edge of the flange portion 23 and having a different curvature from that of the flange portion 23.

The guide portion 25 may be a cut surface. The guide portion 25 may be formed at any position. As shown in FIG. 2, the guide portion 25 allows the thickest portions of the first and second lens portions 21 and 22 to be located at specific positions, so that the sensor lens 20 can be properly mounted at a proper location.

As shown in FIGS. 1 and 3, the sensor lens 20 needs to focus reflected light, reflected from the object 1 to be measured, on the optical device 17. Thus, the optical axis OA of the sensor lens 20 (e.g., in the case of a biconvex lens, the optical axis OA corresponds to the thickest portion of the lens) may be aligned concentrically with the center of the optical device 17.

FIG. 1 illustrates the example in which the optical axis OA of the sensor lens 20 does not coincide with the center of the mirror 14. As described above, the mirror 14 according to the present invention can detect all the distances to surrounding objects by rotating 360 degrees horizontally about its center.

Accordingly, to detect the surrounding objects under the same condition, the reference light emitted from the light source 11 needs to be incident upon the same spot of the mirror 14, despite the rotation of the mirror 14.

To this end, the light passing hole h may be formed at a portion of the sensor lens 20 corresponding to the center of the mirror to which the reference light travels.

To prevent an unnecessary increase in the volume of the sensor lens 20, the sensor lens 20 may be processed to have substantially the same diameter as the effective diameter of the mirror 14 in due consideration of the fact that the light reflected toward the sensor lens 20 by the mirror 14 becomes substantially parallel beams.

The distance measuring apparatus according to this embodiment of the present invention includes the light source 11 and the optical device 17 installed adjacent to each other in the same direction, thereby achieving a reduction in the size of the distance measuring apparatus. In this configuration, the sensor lens 20 including the lens portions, the flange portion, the guide portion and the like can facilitate mechanical coupling thereof.

Figure 4:
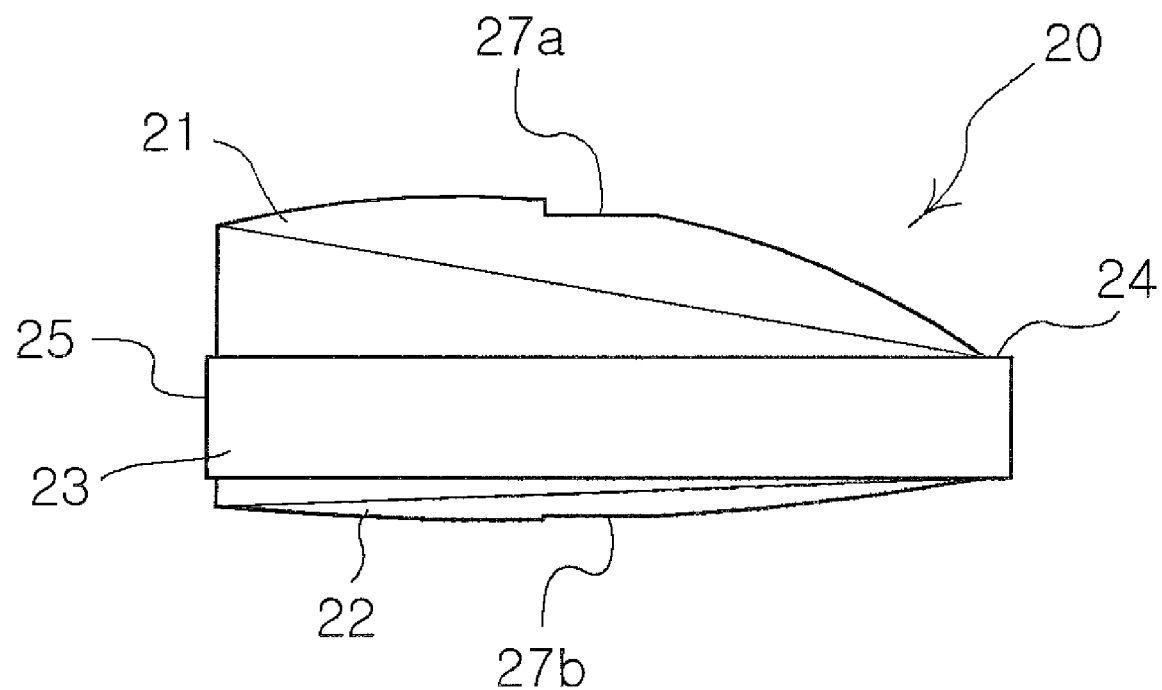
FIG. 4 is a side view of a sensor lens of a distance measuring apparatus according to another exemplary embodiment of the present invention.

Referring to FIG. 4, the sensor lens of a distance measuring apparatus according to another exemplary embodiment of the present invention will now be described.

Like the sensor lens of FIG. 1, the sensor lens of FIG. 4 includes the first lens portion 21, the second lens portion 22, the flange portion 23 and the guide portion 25.

The sensor lens according to the embodiment of FIG. 4 includes light passing planes 27a and 27b as the light passing portion of FIG. 1.

As shown in FIG. 4, the light passing planes 27a and 27b include a first light passing plane 27a provided at the first lens portion 21 of the sensor lens 20, and a second light passing plane 27b provided at the second lens portion 22.

The first light passing plane 27a is formed by processing a portion of a refraction surface of the first lens portion 21 where light is received and emitted, to be substantially perpendicular to the direction in which light travels. Likewise, the second light passing plane 27b is formed by processing a portion of a refraction surface of the second lens portion 22 to be substantially perpendicular to the direction in which light travels.

Assuming that reference light travels substantially vertically in the embodiment of FIG. 1, the first and second light passing planes 27a and 27b of the sensor lens 20 are formed by processing the corresponding portions of the first and second lens portions 21 and 22 to be substantially perpendicular to the direction in which light travels.

The first and second light passing planes 27a and 27b are formed by removing portions of the refraction surfaces of the first and second lens portions 21 and 22 respectively, thereby allowing the reference light to travel without being refracted.

The distance measuring apparatus according to the present invention includes a structure for coupling and fixing the sensor lens, which is an important element in the distance measuring apparatus, to a predetermined structure. In the case that the sensor lens has an asymmetrical shape, the distance measuring apparatus also include a structure for mounting the sensor lens in a proper direction.

While the present invention has been shown and described in connection with the exemplary embodiments, it will be apparent to those skilled in the art that modifications and variations can be made without departing from the spirit and scope of the invention as defined by the appended claims.

What is claimed is:

1. A distance measuring apparatus comprising:
    a light source unit generating reference light for distance measuring;
    a light receiving device receiving light reflected from an object to be measured, which has received the reference light;
    a mirror controlling a path of the reference light, and controlling a path of light, reflected from the object to be measured, toward the light receiving device; and
    a sensor lens focusing the light reflected from the mirror on the light receiving device, the sensor lens comprising:
        a lens portion refracting light;
        a flange portion provided around the circumference of the lens portion and including a coupling portion for fixing the sensor lens; and
        a light passing portion formed at the lens portion.

2. The distance measuring apparatus of claim 1, wherein the sensor lens further comprises a step portion disposed between the lens portion and the flange portion.

3. The distance measuring apparatus of claim 1, wherein the lens portion comprises:
    a first lens portion provided at one side of the flange portion and having an asymmetrical shape; and
    a second lens portion provided at the other side of the flange portion and having an asymmetrical shape.

4. The distance measuring apparatus of claim 3, wherein the sensor lens further comprises a guide unit guiding the direction that the lens portion is mounted.

5. The distance measuring apparatus of claim 4, wherein the guide unit comprises a guide portion provided at one side of the flange portion and having a different curvature from that of the flange portion.

6. The distance measuring apparatus of claim 1, wherein the light passing portion comprises a light passing hole penetrating the sensor lens.

7. The distance measuring apparatus of claim 1, wherein the light passing portion comprises a light passing plane formed by processing a portion of a refraction surface of the lens portion from which light is output, to be substantially perpendicular to the direction in which the light travels.

* * * * *